United States Patent
Jiang et al.

(10) Patent No.: US 9,548,697 B2
(45) Date of Patent: Jan. 17, 2017

(54) PASSIVE SOLAR TRACKING SYSTEM TO ENHANCE SOLAR CELL OUTPUT

(71) Applicant: Wisconsin Alumni Research Foundation, Madison, WI (US)

(72) Inventors: Hongrui Jiang, Madison, WI (US); Chensha Li, Beijing (CN); Ye Liu, San Mateo, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 273 days.

(21) Appl. No.: 13/780,404

(22) Filed: Feb. 28, 2013

(65) Prior Publication Data
US 2014/0238488 A1  Aug. 28, 2014

(51) Int. Cl.
*H02S 20/32* (2014.01)
*F24J 2/38* (2014.01)
(Continued)

(52) U.S. Cl.
CPC .............. *H02S 20/32* (2014.12); *F24J 2/38* (2013.01); *F24J 2/48* (2013.01); *F24J 2/5417* (2013.01);
(Continued)

(58) Field of Classification Search
CPC .................. F24J 2002/5283; F24J 2002/5284; G05D 3/105; H02S 20/30; H02S 20/32; F03G 6/001
See application file for complete search history.

(56) References Cited

U.S. PATENT DOCUMENTS 4,044,752 A * 8/1977 Barak ............................ 126/581
4,158,356 A * 6/1979 Wininger ...................... 126/579
(Continued)

FOREIGN PATENT DOCUMENTS

WO   WO 9211496 A1 * 7/1992

OTHER PUBLICATIONS

Liu et al., "Autonomous passive light tracking utilizing single-wall carbon nanotube enhanced opto-thermo-mechanical elastomer actuators," the 16th International Conference on Solid-State Sensors, Actuators and Microsystems : (Transducers'11), Beijing, China, Jun. 5-9, 2011, pp. 2726-2729.
(Continued)

*Primary Examiner* — Eric R Smith
(74) *Attorney, Agent, or Firm* — Boyle Fredrickson, S.C.

(57) ABSTRACT

A passive solar tracking system to enhance solar cell output is provided. The passive solar tracking system includes a panel having at least one solar cell for solar-to-electric conversion and an actuator that is arranged for moving the panel to provide the variable facing direction of the panel. The actuator is directly driven by light such as sunlight to provide artificial heliotropism-type movements of the panel, so that the panel passively tracks and continuously faces the sun. The actuator may be made from a composite material including a matrix of liquid crystal elastomer material incorporating single-wall or multi-wall carbon nanotubes and an elastic skeleton defined by a 3D polyurethane fiber-network. An actuator housing may be arranged with respect to the actuator for enhancing delivery of stimulus to the actuator. The actuator housing may include a heat collector and a light concentrator for facilitating actuation of the actuator.

20 Claims, 4 Drawing Sheets

(51) Int. Cl.
  *F24J 2/48* (2006.01)
  *F24J 2/54* (2006.01)
  *B82Y 30/00* (2011.01)
  *B29C 35/02* (2006.01)
  *B29C 71/02* (2006.01)

(52) U.S. Cl.
  CPC .............. *F24J 2/5431* (2013.01); *B29C 35/02* (2013.01); *B29C 2071/022* (2013.01); *B82Y 30/00* (2013.01); *F24J 2002/5437* (2013.01); *Y02E 10/47* (2013.01); *Y02E 10/52* (2013.01)

(56) References Cited

U.S. PATENT DOCUMENTS

| | | | |
|---|---|---|---|
| 4,283,588 A * | 8/1981 | Zitzelsberger | 136/246 |
| 4,546,757 A | 10/1985 | Jakahi | |
| 4,628,142 A * | 12/1986 | Hashizume | 136/246 |
| 4,637,376 A * | 1/1987 | Varney et al. | 126/682 |
| 8,188,413 B2 | 5/2012 | Kats et al. | |
| 2005/0284467 A1* | 12/2005 | Patterson | 126/580 |
| 2009/0032014 A1 | 2/2009 | Meydbray | |
| 2009/0189040 A1* | 7/2009 | Fantinelli | 248/276.1 |
| 2010/0258110 A1 | 10/2010 | Krabbe et al. | |
| 2010/0275904 A1* | 11/2010 | Bathurst et al. | 126/600 |
| 2011/0048406 A1* | 3/2011 | Hoffman | 126/600 |
| 2012/0097149 A1* | 4/2012 | Doyle | 126/604 |
| 2012/0279487 A1* | 11/2012 | Pineau et al. | 126/604 |
| 2012/0285509 A1* | 11/2012 | Surganov | 136/246 |

OTHER PUBLICATIONS

Naciri et al., "Nematic Elastomer Fiber Actuator", Macromolecules 2003, 36, 8499-8505.
Li et al., "Reversible white-light actuation of carbon nanotube incorporated liquid crystalline elastomer nanocomposites," Soft Matter, 2011, 7, 7511-7516.
Sherry et al., "The mechanism of floral heliotropism in the snow buttercup", Plant, Cell and Environment (1998) 21, 983-993.
Ohm et al., "Liquid Crystalline Elastomers as Actuators and Sensors", Adv. Mater 2010, 22, 3366-3387.
Mousazadeh et al., "A review of principle and sun-tracking methods of maximizing solar systems output", Renewable and Sustainable Energy Reviews 13 (2009) 1800-1818.
Weickert et al., "Nanostructured Organic and Hybrid Solar Cells", Adv. Mater 2011, 23. 1810-1828.
Brabec et al., "Polymer-Fullerene Bulk-Fleterojunction Solar Cells", Ad. Mater 2010, 22, 3839-3856.
Chen et al., "Recent Progress in Polymer Solar Cells: Manipulation of Polymer; Fullerene Morphology and the Formation Formation of Efficient Inverted Polymer Solar Cells", Adv, Mater. 2009, 21, 1434-1449.
Yildiz et al., "Solar Cells With Enhanced Photocurrent Efficiencies Using Oligoaniline-Crosslinked Au/CdS Nanoparticies Arrays on Electrods", Adv. Funct. Mater. 2008, 18, 3497-3505.
Qian et al., "TiO2-Coated Multilayered SnO2 Hollow Microspheres for Dye-Sensitized Solar Cells", Adv. Mater. 2009, 21, 3663-3667.
Snaith et al., "Estimating the Maximum Attainable Efficiency in Dye-Sensitized Solar Cells", Adv. Funct. Mater. 2010, 20, 13-19.
Yu et al., "A CdSe Nanowire/Quantum Dot Hybrid Architecture for Improving Solar Cell Performance", Adv. Funct. Mater. 2010, 20, 1464-1472.
Krantz et al., "Solution-Processed Metallic Nanowire Electrodes as Indium Tin Oxide Replacement for Thin-Film Solar Cells", Adv. Funct. Mater, 2011, 21, 4784-4787.
Kraemer et al., "High-performance flat-panel solar thermoelectric generators with high thermal concentration", Nature Materials, vol. 10, Jul. 2011, pp. 532-538.
Yoon et al., "Flexible concentrator photovoltaics based on microscale silicon solar cells embedded in luminescent waveguides", Nature Communications, 2:343.

Currie et al., "High-Efficiency Organic Solar Concentrators for Photovoltaics", Science 321, 226 (2008).
Lee et al., "Solar Power Wires Based on Organic Photovoltaic Materials", Science 2009, vol. 324, 232.
Schwede et al., "Photon-enhanced thermionic emission for solar concentrator systems", Nature Materials, vol. 9, Sep. 2010, 762.
Ercole et al, "Photo-responsive systems and biomatenals: photochromic polymers, light-triggered self-assembly, surface modification, fluorescence modulation and beyond", Polymer Chemistry, 2010; 1, 37-54.
Tajbakhsh et al., "Spontaneous Thermal Expansion of Nematic Elastomers", The European Physical Journa. Soft Matter. vol. 6, Issue 2, Oct. 2001, 181-188.
Greve et al., "Nematic Elastomers: The Dependence of Phase Transformation and Orientation Processes on Crosslinking Topology", Macromol. Chem. Phys. 2001, 202, No. 14.
Kaiser et al., "Magnetoactive liquid crystal elastomer nanocompsites", J. Mater. Chem. 2009, 19, 538-543.
Chambers et al., "Liquid crystal elastorner-nanoparticle systems for actuation", J. Mater. Chem, 2009, 19, 1524-1531.
Yang et al., "Reversible Infrared Actuation of Carbon Nanotube-Liquid Crystalline Elastomer Nanocomposites", Adv. Mater. 2008, 20, 2271-2275.
Yu et al., "Directed bending of a polymer film by light", Nature. vol. 425, Sep. 11, 2003,145.
Camacho-Lopez et al., "Fast liquid-crystal elastomer swims into the dark", Nature Materials, vol. 3, May 2004, 307.
Buguin et al., "Micro-Actuators: When Arificial Muscles Made of Nematic Liquid Crystal Elastomers Meet Soft Lithography", J. Am. Chem. Soc. 2006, 128, 1088-1089.
Yamada et al., "Photomobile Polymer Materials: Towards Light-Driven Plsatic Motors", Angew. Chem. Int. Ed. 2008, 47, 4986-4988.
Yamada et al., "Photomobile polymer materials—various three-dimensional movements", J. Mater. Che., 2009, 19, 60-62.
Van Oosten et al., "Printed artificial cilia from liquid-crystal network actuators modularly driven by light", Nature Materials, vol. 8, Aug. 2009, 677.
Cheng et al., "Fully plastic microrobots which manipulate objects using only visible light", Soft Matter, 2010, 6, 3447-3449.
Serak et al., "Liquid crystalline polymer cantilever oscillators fueled by light", Soft Matter, 2010, 6, 779-783.
Sanchez-Ferrer et al., "Liqud-Crystalline Elastomer Microvalve for Microfluidics", Adv. Mater. 2011, 23, 4526-4530.
Wang et al., "Photoinduced Deformation of Crosslinked Liquid-Crystalline Polymer Film Oriented by a Highly Aligned Carbon Nanotube Sheet", Angew. Chem. Int. Ed. 2012, 51, 4644-4647.
Cviklinski et al., "UV Isomerisation in nematic elastomers as a route to photo-mechanical transducers", The European Physical Journal E, vol. 9, Issue 1, 2002, 427-434.
Courty et al., "Nematic elastomers with aligned carbon nanotubes: New electromechanical actuators", Europhys. Lett., 64 (5), pp. 654-660 (2003).
Smela, "Conjugated Polymer Actuators for Biomedical Applications", Adv. Mater. 2003, 15, No. 6, Mar. 2003, 481-494.
Ahir et al., "Photomechanical actuation in polymer-nanotube composites", Nature Materials, vol. 4, Jun. 2005, pp. 491-495.
Dong et al., "Adaptive liquid microlenses activated by stimuli-responsive hydrogels", Nature, vol. 442, Aug. 2006, 551-554.
Wu et al., "NIR-Light-Induced Deformation of Cross-Linked Liquid-Crystal Polymers Using Upconversion Nanophosphors", Journal of the American Chemical Society, 2011, 133, 15810-15813.
Xu et al., "Adaptive liquid lens actuated by photo-polymer" Optics Express, vol. 17, No. 20, Sep. 28, 2009, 17590-17595.
Alexander et al., "Responsive Polymers at the Biology/Materials Science Interface", Adv. Mater. 2006, 18, 3321-3328.
Yu et al., "Soft Actuators Base on Liquid-Crystalline Elastomers", Agnew. Chem. Int. Ed. 2006, 45, 5416-5418.
Donnio et al., "A Simple and Versatile Synthetic Route for the Preparation of Main-Chain, Liquid-Crystalline Elastomers", Macromolecules 2000, 33, 7724-7729.
Ikeda et al., "Photomechanics of Liquid-Crystalline Elastomers and Other Polymers", Agnew. Chem. Int. Ed. 2007, 46, 506-528.

(56) References Cited

OTHER PUBLICATIONS

Ji et al., "Dispersion and Alignment of Carbon Nanotubes in Liquid Crystalline Polymers and Elastomers", Adv. Mater. 2010, 22, 3436-3440.
Krause et al., "Nematic main-chain elastomers: Coupling and orientational behavior", C. R. Chimie 12 (2009) 85-104.
Lee et al., "Sun Tracking Systems: A Review", Sensor 2009, 9, 3875-3890.
Marshall et al., "Carbon-nanotube sensitized nematic, elastomer composites for IR-visible photo-actuation", Soft Matter, 2012, 8, 1570.
Yu et al., "Photocontrollable Liquid-Crystalline Actuators", Adv. Mater 2011, 23, 2149-2180.
Yoshino el al., "Three-Dimensional Photomobility of Crosslinked Azobenzene Liquid-Crystalline Polymer Fibers", Adv. Mater. 2010, 22, 1361-1363.
Zander et al., "State of Order of the Crosslinker in Main-Chain Liquid Crystalline Elastomers", Maoromol. Chem. Phys, 2010, 211, 1167-1176.

\* cited by examiner

PASSIVE SOLAR TRACKING SYSTEM TO ENHANCE SOLAR CELL OUTPUT

REFERENCE TO GOVERNMENT GRANT

This invention was made with government support under 0702095 awarded by the National Science Foundation. The government has certain rights in the invention.

FIELD OF THE INVENTION

The invention relates generally to solar-to-electric conversion efficiency and, in particular, to solar tracking systems for use with solar cells.

BACKGROUND AND SUMMARY OF THE INVENTION

Converting solar energy to electric power holds great promise as a renewable clean energy source. Efforts have been made to improve solar-to-electric conversion efficiency of solar cells and to develop devices that redirect relatively more sunlight onto solar cell surfaces. Other efforts have been made to develop solar tracking systems that can reposition solar cells to follow the sun, but these systems typically require costly and complex tracking devices and actuator systems that consume power for repositioning the solar cells which reduces the net gain of the system because of the power consumed to reposition the solar cells. Such systems have not proven to be cost efficient. Yet other efforts have been made to try to provide artificial heliotropism-type movements for repositioning the solar cells with actuators made from light-induced shape-memory materials, but such materials have proven to provide less actuation than is desirable and tend to fatigue and fail quickly.

Therefore, it is a primary object and feature of the present invention to provide a passive solar tracking system to enhance solar cell output.

It is a still further object and feature of the present invention to provide a solar tracking system having a panel with solar cells that passively tracks and continuously faces the sun.

It is a further object and feature of the present invention to provide a passive solar tracking system to enhance solar cell output by providing actuators that are directly driven by sunlight to provide artificial heliotropism-type movements of the panel.

It is a further object and feature of the present invention to provide a passive solar tracking system to enhance solar cell output by providing actuators that are directly driven by sunlight and actuator housings that are arranged to enhance delivery of sunlight-based stimulus to the actuators.

In accordance with the present invention, a passive solar tracking system to enhance solar cell output is provided that includes a panel having at least one solar cell for solar-to-electric conversion. The panel may be supported on a flexible support extending between the panel and an underlying support surface, such as the ground. The panel is movable for providing a variable facing direction. An actuator is arranged for moving the panel to provide the variable facing direction of the panel. Multiple actuators may be provided for moving the panel based on desired movement characteristics. The actuator(s) may have a variable length that varies in response to a stimulus for driving movement of the panel. The stimulus may have multiple stimuli components, which may include a photo stimulus such as a light-based stimulus as a first stimulus component and a thermal-based stimulus such as heat-based stimulus as a second stimulus component. This may allow the actuator(s) to be directly driven by sunlight to provide artificial heliotropism-type movements of the panel so that the panel passively tracks and continuously faces the sun without parasitically drawing power from the system or otherwise requiring ancillary power for moving the panel.

In accordance with another aspect of the invention, the actuator(s) may be made from a composite material fabricated by way of, for example, a multi-stage cross-linking procedure coupled with a drawing procedure. The composite material may include a matrix of a liquid crystal elastomer material having properties of both liquid crystals and elastomers, which may define photo-thermo-mechanical properties, so as to define reversible dimensional changes which may be anisotropic dimensional changes in response to applied stimulus. Carbon nanostructures, which may be carbon nanotubes such as single-wall or multi-wall carbon nanotubes, may be dispersed through the matrix of a liquid crystal elastomer material. The carbon nanotubes can efficiently absorb and convert photon energy into thermal energy and have excellent thermal conductivities. This allows the carbon nanotubes to act as nanoscale heat sources and provide a thermal conduction pathway to effectively heat the liquid crystal elastomer matrix, elevating its temperature to above its nematic-isotropic transition temperature, changing the nematic order, and leading to a reversible axial contraction and mechanical actuation. An elastic skeleton is arranged within the composite material and includes a fiber network which may be a 3D polyurethane-based fiber network may also be dispersed through the matrix of liquid crystal elastomer material, providing a reinforcement phase into the matrix of liquid crystal elastomer material. This may provide a nematic-phase texture of the composite material that has mesogenic units that are substantially uniaxially aligned. Correspondingly, the nematic-isotropic transition temperature of the composite material may be significantly lower when incorporating the polyurethane fiber network along with carbon nanostructuers, as compared to without the polyurethane fiber network and may be less than about 70° C. or less than about 68° C. This may provide an actuator(s) that has a nematic-isotropic transition temperature that is sufficiently low to allow for actuation that is directly driven by sunlight.

In accordance with another aspect of the invention, the passive solar tracking system may include an actuator housing for each of the actuators that surrounds at least a portion of the respective actuator for facilitating delivery of the stimulus to the actuator. The actuator housing may include a heat collector arranged to direct heat toward the actuator. The heat collector may be defined at least partially by a body of the actuator housing through which a cavity may longitudinally extend such that at least a portion of the actuator is arranged in the cavity of the body. The cavity may define a partial cylindrical shape corresponding to a section of a cylinder that extends longitudinally through the cylinder. The body of the actuator housing may have a dark color and may be made from a black polymeric material such as a polytetrafluoroethylene material. This may enhance heat capacitance of the actuator housing which may correspondingly enhance actuation of the actuator.

In accordance with another aspect of the invention, the actuator housing may include a light concentrator arranged to direct sunlight toward the actuator. The light concentrator may define a curved surface for directing the sunlight toward the actuator, which may define a reflective wall extending generally parallel to and transversely spaced from the actuator. The curved surface may be configured to focus the sunlight onto the actuator. The reflective wall may be made from a silver and/or mercury coated glass or may include a reflective film, such as a multilayer polymer film. The light concentrator may include a clear wall that may be made from a clear material such as a high-transmittance material that attenuates light by a relatively nominal extent. The clear wall allows ambient light to transmit through it and directly onto the actuator, for example, onto an outer surface of the actuator. The clear and reflective walls may be spaced from each other and define the outer perimeter of the cavity through which the actuator extends. Ambient light transmitted through the clear wall but around the actuator may be reflected off the reflective wall and directed to the actuator, for example, onto an inner surface of the actuator. This may allow the actuator to simultaneously receive sunlight on both a side that faces the sun and a side that faces away from the sun which may enhance actuation of the actuator.

BRIEF DESCRIPTION OF THE DRAWINGS

The drawings furnished herewith illustrate a preferred construction of the present invention in which the above advantages and features are clearly disclosed as well as others that will be readily understood from the following description of the illustrated embodiment.

In the drawings.

DETAILED DESCRIPTION OF THE DRAWINGS

Figure 1:
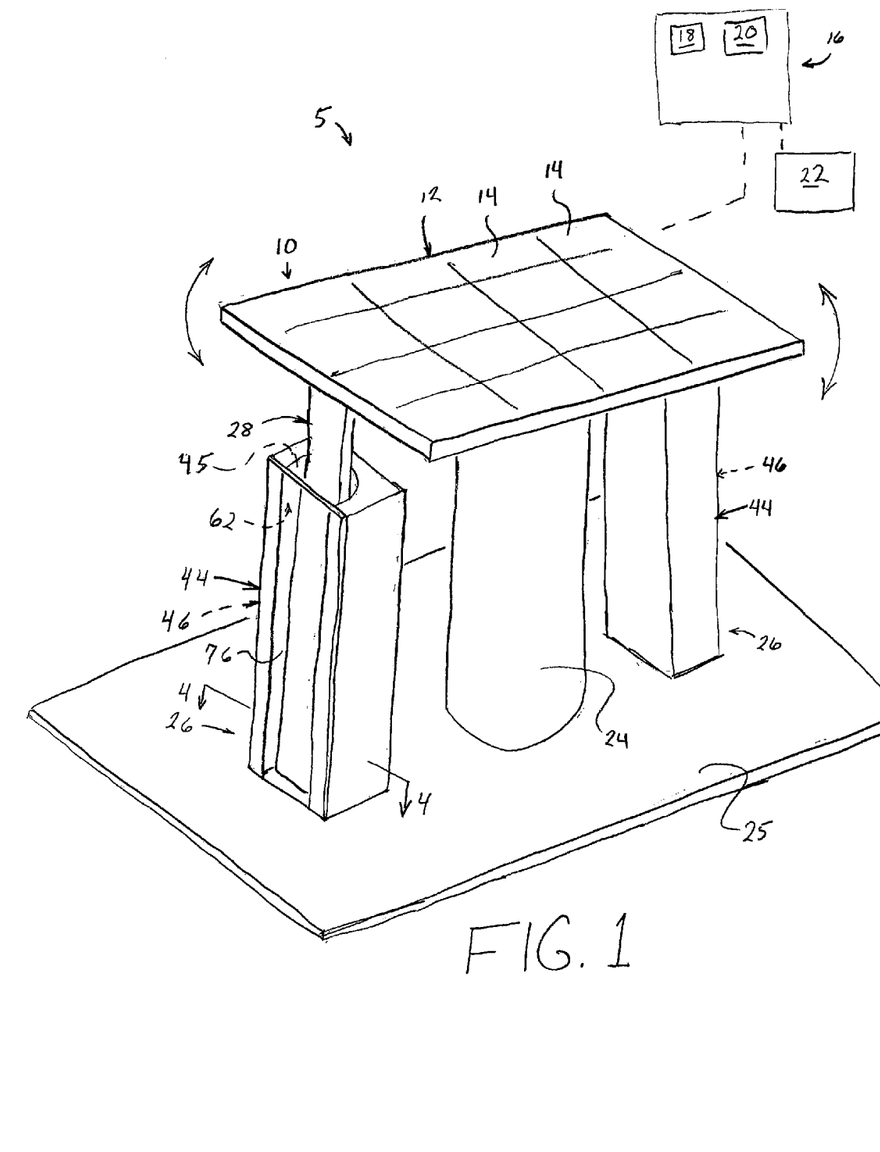
FIG. 1 is a pictorial view of a schematic representation of a solar tracking system in accordance with the present invention.
Figure 2:
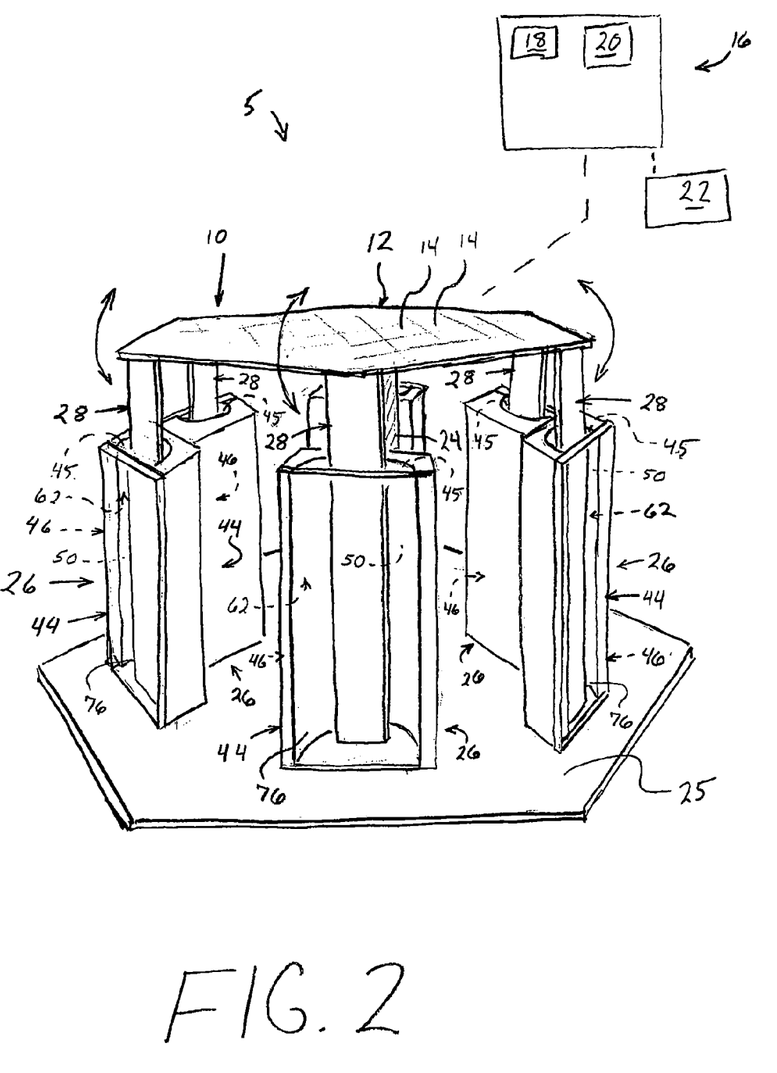
FIG. 2 is a pictorial view of a schematic representation of a variant of the solar tracking system of FIG. 1.

Referring to FIGS. 1 and 2, a solar tracking system 5 is shown for passively tracking sunlight with a solar power system 10. The solar power system 10 includes a panel 12 having at least one solar cell 14 for solar-to-electric conversion and a control system 16 operably connected to the panel 12 and is shown as including a controller 18 and an inverter 20 that are operably connected to an electrical power consuming device 22.

Still referring to FIGS. 1 and 2, the panel 12 is movable for providing a variable facing direction, allowing the solar cell(s) 14 to track and continuously face the sun throughout daylight hours. A support 24 extends from a central segment of the panel 12, between the panel 12 and an underlying support surface 25 which may sit upon the ground. The support 24 may be configured to telescope to provide a variable height and may include a hinge, such as a multiaxial hinge or a ball joint, between the support 24 and the panel 12 to allow for compound movements of the panel 12 having yaw, pitch, and roll movements components. In another embodiment, the support 24 is made from an elastomeric or other resilient material that provides support in a vertical direction while being compliant to accommodate movements of the panel 12.

Still referring to FIGS. 1 and 2, movement of the panel 12 is provided by actuator assemblies 26 that are automatically driven by light such as sunlight. The actuator assemblies 26 are spaced from each other and are arranged to move different portions of the panel 12, which may include moving the different portions of the panel 12 by different amounts or at different rates to achieve such compound movements of the panel 12 for tracking the sun. Each actuator assembly 26 includes an actuator 28 defining a beam, film, or other configuration and having a variable length that varies in response to a stimulus for driving movement of the panel 12.

Still referring to FIGS. 1 and 2, the actuator 28 may be made from a material that is photo and/or thermal responsive to stimulus so as to provide actuation, whereby the stimulus may have multiple stimuli components, which may include a photo stimulus such as a light-based stimulus as a first stimulus component and a thermal-based stimulus such as heat-based stimulus as a second stimulus component for changing the length of the actuator 28. In one embodiment, the actuator 28 is a soft polymer actuator that may be made from a composite material that includes a matrix of a liquid crystal elastomer material having properties of both liquid crystals and elastomers, which may define photo-thermo-mechanical properties, so as to define reversible dimensional changes that may be anisotropic dimensional changes in response to applied stimulus. Carbon nanostructures, which may be carbon nanotubes such as single-wall or multi-wall carbon nanotubes, may be dispersed through the matrix of liquid crystal elastomer material. The carbon nanotubes are arranged to efficiently absorb and convert photon energy into thermal energy and provide sufficient thermal conductivities for enhancing length changes of the actuator 28. This allows the carbon nanotubes to act as nanoscale heat sources and provide a thermal conduction pathway to effectively heat the liquid crystal elastomer matrix, elevating its temperature to above its nematic-isotropic transition temperature, changing the nematic order, and leading to a reversible axial contraction and mechanical actuation. A fiber network which may be a polyurethane-based fiber network may also be dispersed through the matrix of liquid crystal elastomer material, providing a reinforcement phase into the matrix of liquid crystal elastomer material. The fiber network may be arranged so that it is tightly cladded by the matrix of liquid crystal elastomer material and carbon nanotubes. The matrix of liquid crystal elastomer and carbon nanotubes mix with the fibers in the fiber network, cladding the fibers without penetrating into the fibers themselves. This may provide a nematic-phase texture of the composite material that has mesogenic units that are substantially uniaxially aligned. Correspondingly, the nematic-isotropic transition temperature of the composite material may be significantly lower when incorporating the polyurethane fiber network along with carbon nanostructuers, as compared to without the polyurethane fiber network and may be less than about 70° C. or less than about 68° C.

Figure 3:
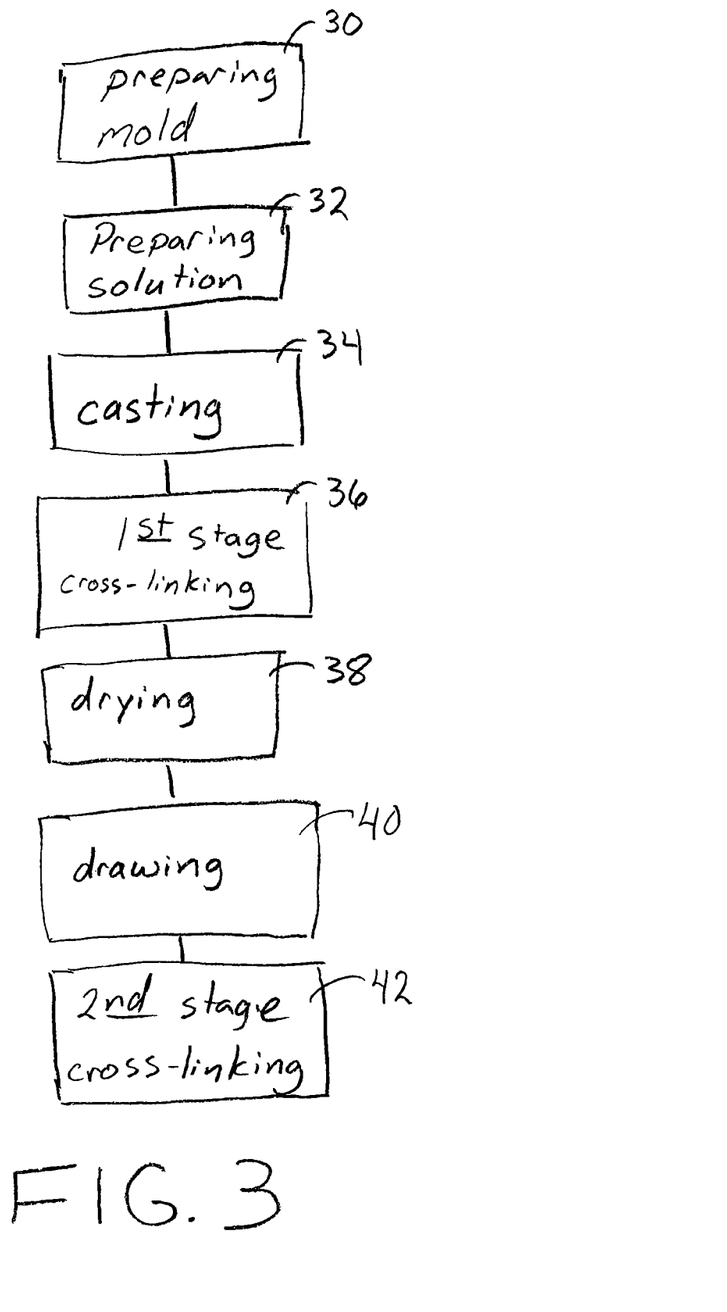
FIG. 3 is a flowchart of a fabrication process for making an actuator of a solar tracking system in accordance with the present invention.

Referring now to FIG. 3, one embodiment of a method of making the actuator 28 is shown. As represented at block 30, a mold is prepared. The mold may be made from a polytetrafluoroethylene material and have a chamber defined therein. A mass of an elastomeric material, such as polyurethane porous rubber, that is larger than the chamber of the mold may be squeezed into the chamber of the mold so that the elastomeric material is initially held in the mold under compression along at least one axis. In one embodiment, a mass of polyurethane porous rubber is compressed in a transverse direction within the mold and is unconstrained in a longitudinal direction within the mold. The mass of polyurethane porous rubber may be arranged in a central portion of the mold so that a pair of spaces defined by the chamber of the mold is defined on opposing sides of the mass of polyurethane porous rubber, while the mass of polyurethane porous rubber is being compressed transversely across the mold. As represented at block 32, a solution is prepared. The solution may include carbon nanostructures, which may be carbon nanotubes such as single-wall or multi-wall carbon nanotubes that have been added to a reaction mixture solution. The reaction mixture solution may include about 0.06 g of poly-methylhydrosiloxane, about 0.25 g of 4-methoxyphenyl-4-(1-buteneoxy)benzoate (0.84 mmol), and about 0.034 g of 1,4 alkeneoxybenzene (0.082 mmol) solved in about 1 mL of toluene, ultrasonicated for 2 min to provide a homogeneous dispersion. A catalyst solution of about 50 µL such as about 46 µL may be added into the reaction mixture solution containing carbon nanotubes. As represented at block 34, the solution is cast into the mold. The solution may be fully absorbed into the polyurethane porous rubber and held inside it by a capillary force(s). In one embodiment, it is ensured that the reaction solution just saturates the polyurethane porous rubber with neither redundant solution overflow nor with an inadequate amount of reaction solution.

Still referring to FIG. 3, as represented at block 36, a first stage of a cross-linking procedure is performed to provide partial cross-linking. This may be done by covering the mold with a cap and heating at about 65° C. for about 50 min and the mold may be cooled down to room temperature to provide the partial cross-linking. After this partial cross-linking, the solution has converted to a swollen gel incorporating the carbon nanotubes, and the pores of the polyurethane porous rubber were fully filled by the partially cross-linked gel. As represented at block 38, a drying procedure is performed. During the drying procedure, toluene contained in the gel was gradually evaporated, which may be done for about 40 minutes, and the gel shrinks causing the polyurethane porous rubber to shrink with it, which compresses the pores of the polyurethane porous rubber. The shrunken size of the gel forces the elastic polyurethane porous rubber to shrink together as a composite block.

Still referring to FIG. 3, as represented at block 40, a drawing procedure is performed to gradually stretch the composite block. This may be done by suspending a first end of the composite block, such as by spaced-apart hooks, and attaching weights, for example about 5 weights, each of which may be about 7 g, to a second end of the composite block. The weights may be left attached to the composite block for about 12 hours so as to provide gradual uniaxial stretch. During the drawing procedure, the gel-filled polyurethane porous rubber was stretched up to its initial height which was framed by the polytetrafluoroethylene mold used. The gel, being tightly adhered with the polyurethane fiber-network, was also forced to stretch with the polyurethane fiber-network. Consequently, the alignment of mesogenic units along the stretching direction was formed. In addition, the pores in the polyurethane porous rubber expanded back during the drawing process, while the gel cladding the polyurethane fiber-network became thinner during the stretching process, leading to partial release of the pores. This results in the ultimate porous structure in the now stretched composite block resembling the 3D polyurethane fiber-network.

Still referring to FIG. 3, as represented at block 42, a second stage of the cross-linking procedure is performed to complete cross-linking reaction in a nematic phase. This may be done by annealing the composite block at about 70° C. This may be done with the weights still attached and for about 12 hours or overnight. In this way, the actuator 28 can be made to provide a composite material having a matrix of liquid crystal elastomer material incorporating carbon nanotubes and an elastic skeleton defined by a 3D polyurethane fiber-network that may be tightly cladded by the matrix. The matrix of liquid crystal elastomer and carbon nanotubes mix with the fibers in the fiber network, cladding the fibers without penetrating into the fibers themselves.

Referring again to FIGS. 1 and 2, an actuator housing 44 is arranged with respect to each actuator 28 to receive light such as sunlight and direct a corresponding stimulus to the respective actuator 28 for varying its length so as to drive movement of the panel 12 for varying the facing direction of the panel 12. As shown, each actuator housing 44 may surround at least a portion of the respective actuator 28, defining an opening 45 at the top from which an uncovered portion of the actuator 28 extends. The actuator housing 44 may include a heat collector 46 arranged to direct heat toward the actuator 28. The heat collector 46 may be defined at least partially by a body 48 (FIG. 4) of the actuator housing 44 through which a cavity 50 (FIGS. 2 and 4) longitudinally extends. The cavity 50 may define a partial cylindrical perimeter shape corresponding to a section of a cylinder that extends longitudinally through the cylinder, providing a cross-sectional shape having a curved boundary segment as shown in FIG. 4.

Figure 4:
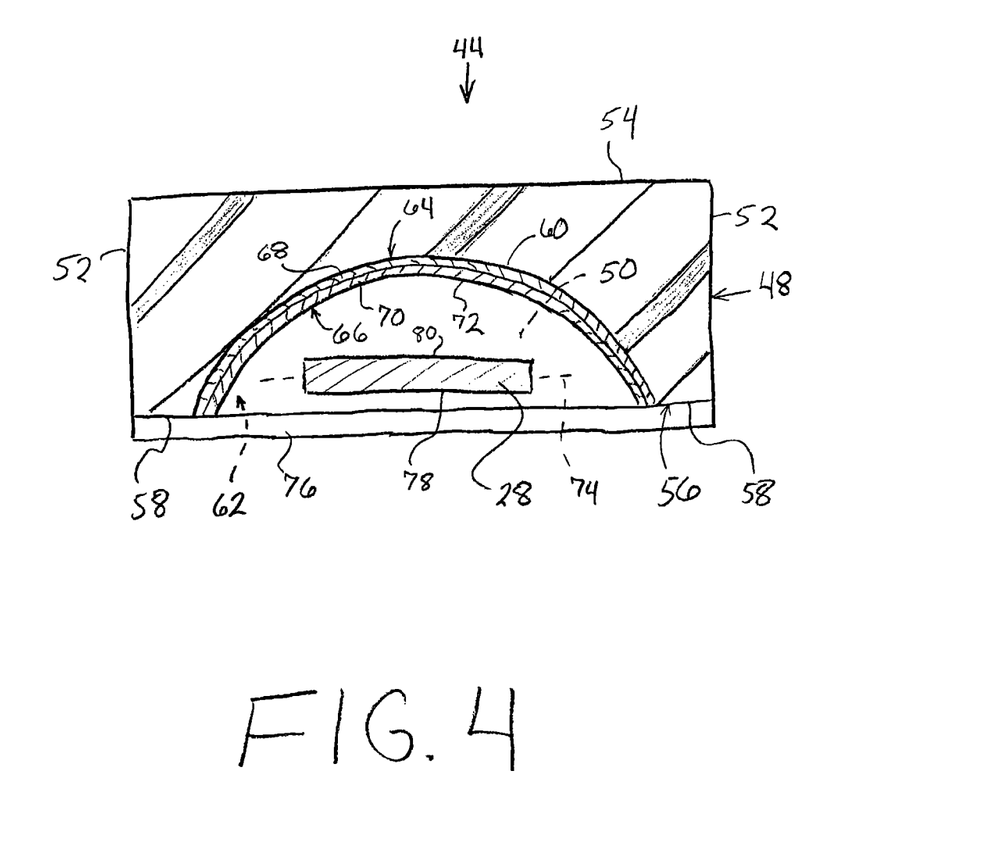
FIG. 4 is a cross-sectional view of an actuator assembly of FIG. 1, taken at line 4-4 of FIG. 1.

Still referring to FIG. 4, the body 48 includes a pair of side walls 52 that are interconnected by a back wall 54 and a front wall 56. The front wall 56 includes outer segments 58 and an intermediate segment 60 extending between and connecting the outer segments 58 to each other. The intermediate segment 60 is curved, corresponding to a portion of the perimeter shape of the cavity 50. The body 48 may be made from a material that provides insulation and heat capacitance and transmittance to the actuator housing 44 in an amount sufficient to enhance actuation of the actuator 28. The body 48 may be dark in color and may be made from a black polymeric material such as a polytetrafluoroethylene material.

Referring again to FIGS. 1 and 2, the actuator housing 44 may include a light concentrator 62 arranged to direct light such as sunlight toward the actuator 28. Referring again to FIG. 4, the light concentrator 62 may be nested at least partially within the heat collector 46 having a reflective wall 64 that may be made from a silver and/or mercury coated glass or may include a reflective film 66, such as a multilayer polymer film. The reflective film 66 may include an inner film layer 68 that is arranged upon the front wall intermediate segment 60 of the actuator housing body 48. An outer film layer 70 is arranged outwardly of the inner film layer 68, defining an outer boundary of the cavity 50. In this embodiment, a curved surface 72 is defined at an outwardly facing surface of the reflective wall 64. The curved surface 72 may be configured to focus the sunlight onto the actuator 28. This may be done by forming the reflective wall 64 with a curvature that allows sunlight to reflect off the reflective wall 64 and be focused upon a focus plane 74. The focus plane 74 lies generally coplanar with a plane extending transversely through the actuator 28, when the actuator 28 is in a resting state.

Still referring to FIG. 4, the light concentrator 62 of this embodiment includes a clear wall 76 that may be made from a clear material such as a high-transmittance material that attenuates light by a relatively nominal extent. The clear wall 76 is spaced from the reflective wall 64 such that collectively the reflective and clear walls 64, 76 define an outer perimeter of the cavity 50. In this way, the outer perimeter of the cavity 50 has a flat side defined by the clear wall 76 and a curved side defined by the reflective wall 64. The clear wall 76 allows sunlight to transmit through it and directly onto the actuator 28, for example, onto an outer surface 78 of the actuator 28. Sunlight that transmits through the clear wall 76 but is not intercepted by the outer surface 78 of the actuator 28 reflects off from the reflective wall 64, toward the focus plane 74 and onto an inner surface 80 of the actuator 28. This allows the light concentrator 62 to simultaneously direct sunlight to opposing surfaces of the actuator 28, including the inner surface 80 which may not be in a line-of-sight relationship with the sun.

Various modes of carrying out the invention are contemplated as being within the scope of the following claims particularly pointing out and distinctly claiming the subject matter which is regarded as the invention.

We claim:

1. A passive solar tracking system to enhance solar cell output, comprising:
   a panel having at least one solar cell for solar-to-electric conversion, the panel being movable for providing a variable facing direction;
   an actuator extending along a vertical axis, having a first end operatively connected to the panel for supporting the panel above a supporting surface, an opposite second end and an outer periphery, and being arranged for moving the panel to provide the variable facing direction of the panel, the actuator being fabricated from a composite material including:
      an elastic skeleton arranged in the composite material and including a fiber network dispersed through the composite material; and
   an actuator housing extending along the axis and defining an actuator cavity for receiving the actuator therein, the actuator housing including:
      a first open end and a second closed end adjacent the supporting surface, the first end of the actuator extending through the first open end of the actuator housing;
      a stimulus concentrator having first and second edges and an inner surface for directing a stimulus towards the actuator; and
      a transparent panel extending between the first and second edges of the stimulus concentrator;
   wherein:
   the actuator has a variable length that varies in response to the stimulus to move the panel to provide the variable facing direction of the panel; and
   the actuator housing remains stationary as the panel is moved by the actuator.

2. The passive solar tracking system of claim 1 wherein the composite material includes a matrix of a liquid crystal elastomer material having properties of both liquid crystals and elastomers defining reversible anisotropic dimensional changes in response to applied stimuli.

3. The passive solar tracking system of claim 2 wherein the composite material includes carbon nanostructures dispersed through the matrix of the liquid crystal elastomer material.

4. The passive solar tracking system of claim 1 wherein the actuator housing includes a heat collector arranged to direct heat toward the actuator.

5. The passive solar tracking system of claim 4 wherein the heat collector is defined at least partially by the inner surface of the stimulus concentrator.

6. The passive solar tracking system of claim 5 wherein at least a portion of the stimulus concentrator of the actuator housing has a dark color.

7. The passive solar tracking system of claim 6 wherein at least a portion of the stimulus concentrator of the actuator housing is made from a black polymeric material.

8. The passive solar tracking system of claim 1 wherein the stimulus concentrator is a light concentrator arranged to direct sunlight toward the actuator.

9. The passive solar tracking system of claim 8 wherein the light concentrator defines the inner surface of stimulus concentrator and directs the sunlight toward the actuator.

10. The passive solar tracking system of claim 9 wherein the inner surface defines a reflective wall extending generally parallel to the actuator.

11. The passive solar tracking system of claim 10 wherein the reflective wall includes a reflective polymer film.

12. The passive solar tracking system of claim 10 wherein the reflective wall is transversely spaced from the actuator.

13. The passive solar tracking system of claim 10 wherein the inner surface is configured to focus the sunlight onto the actuator.

14. A passive solar tracking system to enhance solar cell output, comprising:
   a panel having at least one solar cell for solar-to-electric conversion, the panel being movable for providing a variable facing direction;
   an actuator operatively connected to the panel for supporting the panel above a supporting surface and being arranged for moving the panel to vary the facing direction of the panel, the actuator extending along a vertical axis and being made from a material defining reversible dimensional changes in response to heat corresponding to dimensional changes of the actuator driving movement of the panel for varying the facing direction of the panel; and
   an actuator housing extending along the vertical axis about the actuator and defining an actuator cavity for receiving the actuator therein, the actuator housing including:
      a first open end and a second closed end adjacent the supporting surface, a first end of the actuator extending through the first open end of the actuator housing;
      a heat collector having first and second edges, the heat collector directing sunlight received within the actuator cavity of the actuator housing toward the actuator to heat the actuator and vary the length of the actuator; and
      a transparent panel extending between the first and second edges of the heat collector, the transparent panel allowing sunlight to enter the actuator cavity;
   wherein the actuator housing remains stationary in response to movement of the panel by the actuator.

15. The passive solar tracking system of claim 14 wherein the actuator housing includes a body defining the heat collector and made from a dark material absorbing energy from sunlight received in the actuator cavity and directing heat toward the actuator.

16. The passive solar tracking system of claim 14 wherein the heat collector includes a reflective wall directing sunlight toward the actuator.

17. A passive solar tracking system to enhance solar cell output, comprising:
   a panel having at least one solar cell for solar-to-electric conversion, the panel being movable for providing a variable facing direction;
   an actuator operatively connected to the panel for supporting the panel above a supporting surface and arranged for moving the panel to vary the facing direction of the panel, the actuator extending along a vertical axis and being made from a material defining reversible dimensional changes in response to a stimulus corresponding to dimensional changes of the actuator driving movement of the panel for varying the facing direction of the panel; and an actuator housing extending along the vertical axis about the actuator and defining an actuator cavity for receiving the actuator therein, the actuator housing including:
- a first open end and a second closed end adjacent the supporting surface, a first end of the actuator extending through the first open end of the actuator housing;
- a light concentrator having first and second edges, the light concentrator directing sunlight received within the actuator cavity toward the actuator for providing the stimulus for varying the length of the actuator; and,
- a transparent panel extending between the first and second edges of the light concentrator, the transparent panel allowing sunlight to enter the actuator cavity;

wherein the actuator housing remains stationary in response to movement of the panel by the actuator.

18. The passive solar tracking system of claim 17 wherein the light concentrator surrounds at least a portion of the actuator for facilitating delivery of the stimulus to the actuator.

19. The passive solar tracking system of claim 18 wherein the light concentrator includes a reflective wall that is curved for directing sunlight toward the actuator.

20. The passive solar tracking system of claim 17 wherein multiple actuators spaced apart from each other extend from the panel and multiple actuator housings are arranged with respect to the multiple actuators to provide stimulus for varying the length of the multiple actuators, respectively.

* * * * *